US008776462B2

(12) United States Patent
Foerg et al.

(10) Patent No.: US 8,776,462 B2
(45) Date of Patent: Jul. 15, 2014

(54) FIRESTOP COLLAR

(71) Applicant: Hilti Aktiengesellschaft, Schaan (LI)

(72) Inventors: Christian Foerg, Lamerdingen (DE); Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/662,953

(22) Filed: Oct. 29, 2012

(65) Prior Publication Data
US 2013/0104475 A1 May 2, 2013

(30) Foreign Application Priority Data
Oct. 27, 2011 (DE) .......................... 10 2011 085 351

(51) Int. Cl.
*E04C 2/00* (2006.01)
*F16L 5/04* (2006.01)
*A62C 2/06* (2006.01)

(52) U.S. Cl.
CPC .. *F16L 5/04* (2013.01); *A62C 2/065* (2013.01)
USPC ........................................... 52/232; 52/220.8

(58) Field of Classification Search
USPC .................... 52/232, 220.8, 219, 317
See application file for complete search history.

(56) References Cited

U.S. PATENT DOCUMENTS

| 5,103,609 A * | 4/1992 | Thoreson et al. ................ 52/232 |
| 5,947,159 A * | 9/1999 | Takahashi ....................... 138/156 |
| 5,970,670 A * | 10/1999 | Hoffman ......................... 52/232 |
| 6,725,615 B1 * | 4/2004 | Porter ............................. 52/232 |
| 7,596,914 B2 * | 10/2009 | Stahl et al. ................... 52/220.8 |
| 7,784,234 B2 * | 8/2010 | Warmolts et al. ................ 52/317 |
| 2005/0189768 A1 * | 9/2005 | Avram et al. ................ 285/419 |

FOREIGN PATENT DOCUMENTS

| DE | 198 52 120 | 3/2000 |
| GB | 2388174 | 11/2003 |
| WO | WO 00/68608 | 11/2000 |

* cited by examiner

*Primary Examiner* — William Gilbert
*Assistant Examiner* — Kyle Walraed-Sullivan
(74) *Attorney, Agent, or Firm* — Davidson, Davidson & Kappel, LLC

(57) ABSTRACT

With a firestop collar having a housing that can accommodate an insert made of an intumescent firestop compound and having at least one bracket with which the housing can be secured to a substrate, it is provided that the bracket is secured to the housing by a latching connection that is established by moving the bracket from the outside towards the center of the housing.

12 Claims, 3 Drawing Sheets

FIRESTOP COLLAR

This claims the benefit of German Patent Application DE 10 2011 085 351.0, filed Oct. 27, 2011 and hereby incorporated by reference herein.

The present invention relates to a firestop collar having a housing that can accommodate an insert made of an intumescent firestop compound and having at least one bracket with which the housing can be secured to a substrate.

BACKGROUND

Firestop collars serve to seal off wall penetrations for meltable or combustible lines, for instance, pipes or cables, in case of fire. Such a firestop collar has an insert made of an intumescent firestop compound (hereinafter also referred to as an intumescent insert) that can be placed around the line as well as a housing into which the intumescent insert is placed. Upon exposure to extreme heat, for example, in case of fire, the intumescent insert expands, thereby hermetically sealing off the wall penetration, thus preventing propagation of the fire or smoke through the wall penetration. The housing serves to affix and to secure the intumescent insert in its position on the wall penetration so that, in case of fire, it expands in such a way that the wall penetration is completely closed off. Naturally, the firestop collar can also be employed in a penetration through a floor/ceiling. For the sake of simplicity, only the terms wall or wall penetration will be employed below.

German patent application DE 198 52 120 A1, for instance, discloses such a firestop collar. In the circumferential direction, the housing has an interruption so that the housing, together with the intumescent insert placed into it, can be placed around the line. At one circumferential end of the housing, there are tabs that can be pushed into recesses on the opposite end in order to close off the housing in the circumferential direction. This firestop collar is secured in a wall penetration by means of hooks that are hooked into an axial end of the cylinder formed by the housing. These hooks also cover up the tabs on the outside of the housing, thus constituting a securing mechanism for the closure of the housing. On the one hand, this has the drawback that the installation of the collar is very laborious since the circumference of the collar has to be adjusted and the hook has to be secured at the same time. Moreover, the hooks project into the interior and come to into contact with the line, so that they can prevent an unhindered expansion of the intumescent insert.

Another collar is disclosed in international patent application WO 2000/68608 A1. Here, the fastening hooks are pushed into means for holding the hooks on the outer circumference in the axial direction, which has the disadvantage that a secure connection to the fastening hooks is only established in one direction. The housing with the intumescent insert can be slid in the opposite direction against the hooks, so that the collar might be pushed off the hooks.

SUMMARY OF THE INVENTION

It is an object of the present invention to provide a firestop collar that allows an easy and reliable installation.

In order to achieve this objective, with a firestop collar having a housing that can accommodate an insert made of an intumescent firestop compound and having at least one bracket with which the housing can be secured to a substrate, it is provided that the bracket is secured to the housing by means of a latching connection that is established by moving the bracket from the outside towards the center of the housing. With this firestop collar, the brackets do not project into the interior, so they do not come into contact with the intumescent insert and cannot hinder its expansion in case of fire. Since the brackets on the outside can be simply snapped on by means of a latching connection, they can be easily and quickly installed on the housing.

Preferably, the bracket has at least two latching hooks. They can be oriented facing each other so that they are pressed away from each other when the bracket is installed on the housing. As an alternative, the latching hooks can be oriented facing away from each other, so that they are pressed towards each other. Consequently, the latching hooks are pretensioned against each other when they are placed onto an abutment provided on the housing, as a result of which the bracket is securely held by means of the latching hooks.

Moreover, two latching hooks situated at a distance from each other allow an exact positioning of the bracket, so that it cannot be dislodged during installation.

The latching hooks can also be provided on the housing instead of on the bracket. In this case, the bracket is provided with an appropriate abutment into which the latching hooks can latch.

Preferably, these latching hooks are arranged pairwise opposite from each other. They can be oriented, for instance, facing each other so that, between them, they can hold the bracket or an abutment provided on the housing. Alternatively, the latching hooks can also be oriented facing away from each other so that each one of them latches with a latching hook of the bracket or the housing. It is likewise conceivable that latching hooks that interact with each other are provided on the housing as well as on the bracket.

The housing consists, for example, of several segments that can bend relative to each other, whereby the opposing latching hooks provided on the housing, except for the end sections of the housing, are arranged on one segment. If the latching hooks were to be arranged on two segments that can bend relative to each other, the bending would change the distance between the latching hooks, so that the pretensioning of the latching hooks could be lost, and an adequate hold of the hook on the housing would no longer be ensured. Since both latching hooks are arranged on one segment, it is ensured that the distance between the latching hooks and thus the holding force generated when the bracket is put in place is constant in each case, thus ensuring a secure connection to the bracket.

Positioning projections that restrict a relative movement between the bracket and the housing can be provided on the latching hooks. They can prevent, for instance, that the bracket can be pushed out of the latching connection in the axial direction. However, these positioning projections can also contribute to compensating for irregularities in the substrate onto which the firestop collar is to be mounted.

Instead of the latching hooks being provided on the housing, it is, for example, likewise conceivable to provide the housing with recesses for latching hooks that are installed on the bracket. These recesses form an abutment for the latching hooks. This has the advantage that the housing does not have any projections on the outside that would protrude during installation in a wall penetration and that could hinder the insertion of the firestop collar.

In another embodiment, the latching connection extends over a gap in the housing, thereby closing the housing in the circumferential direction. Therefore, the latching connection or the bracket additionally have the function of closing the housing in the circumferential direction. For this purpose, the latching hooks are configured on the bracket or else the abutment is configured on the housing in such a way that the edges of the housing are pressed towards each other when the bracket is put in place, so that the latching hooks of the bracket pull the housing towards the edges so to speak.

At the ends of the housing that lie across from each other at the gap, there is preferably a stop that determines the position of the edges relative to each other. If these ends were not provided, the edges of the housing would be pulled towards each other by the latching hooks when the bracket is put in place, so that the pretensioning of the latching hooks would be lost. The result would be that the bracket could not be affixed to the housing. Moreover, in this case, the housing would not be closed by the bracket. Due to the pretensioning of the latching hooks, the ends of the housing are pressed against the stop, thus being securely positioned with respect to each other.

The bracket preferably has a slot so as to allow flexible installation on a substrate.

BRIEF DESCRIPTION OF THE DRAWINGS

Additional features and advantages ensue from the description below in conjunction with the accompanying drawings. The following is shown.

DETAILED DESCRIPTION

Figure 1:
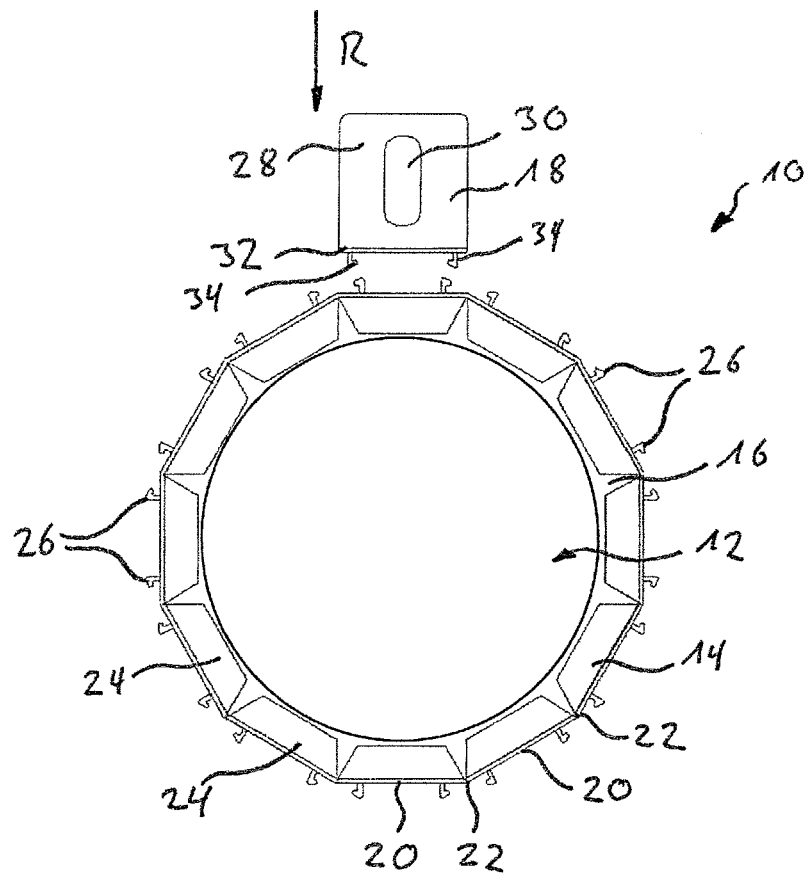
FIG. 1: a schematic depiction of a firestop according to the invention.

FIG. 1 shows a firestop collar 10 for closing off a wall penetration for a line. The firestop collar 10 defines an interior 12 into which a line, for example, a pipe or a cable, can be placed. The firestop collar 10 has a housing 14 into whose interior an insert made of intumescent firestop compound 16 has been placed. Furthermore, several brackets 18 are provided in order to affix the firestop collar 10 to the substrate. For the sake of simplicity, only one bracket 18 is depicted here.

The firestop collar 10, with a line inserted into it, can be positioned on a wall penetration, as a result of which the wall penetration is largely closed off. Subsequently, the housing 14 is affixed to the wall penetration by means of the brackets 18, so that any shifting of the firestop collar 10 is prevented. Under exposure to heat, the insert made of intumescent firestop compound 16 can expand in such a manner that it hermetically seals off the wall penetration so as to prevent smoke or fire from getting through.

The housing 14 is shaped out of a flat sheet of metal (also see FIG. 6) whereby flexible areas 22 are provided at regular intervals by means of which the metal sheet is divided into several segments 20 that are flexible with respect to each other and that form a regular polygon when the housing 14 has been assembled (see FIG. 1). Tabs 24 that are bent inwards at a right angle are provided on both ends of each segment 20 in the axial direction. The insert made of intumescent firestop compound 16 is arranged between the tabs 24 of the housing 14 and held by them, whereby the insert made of intumescent firestop compound 16 is arranged around the entire inner circumference of the housing 14.

On the outside of each segment 20, there are two latching hooks 26 that are arranged pairwise opposite from each other and facing away from each other. The latching hooks serve to secure the bracket 18.

The tabs 24 as well as the latching hooks 26 are each formed in that they are bent and/or stamped out of the sheet of metal.

The brackets 18 are formed out of a metal sheet bent at a right angle, whereby a slot 30 that serves to secure the bracket 18 and thus the firestop collar 10 to the substrate is provided on a first leg 28. Two latching hooks 34 that are arranged here so as to be oriented against each other and pairwise across from each other are provided on the second leg 32. The distance between these latching hooks 34 is selected such that they match the latching hooks 26 on the outer circumference of the housing 14. The latching hooks 34 are likewise formed in that they are stamped or bent out of the second leg 32 (see FIG. 2).

Figure 2:
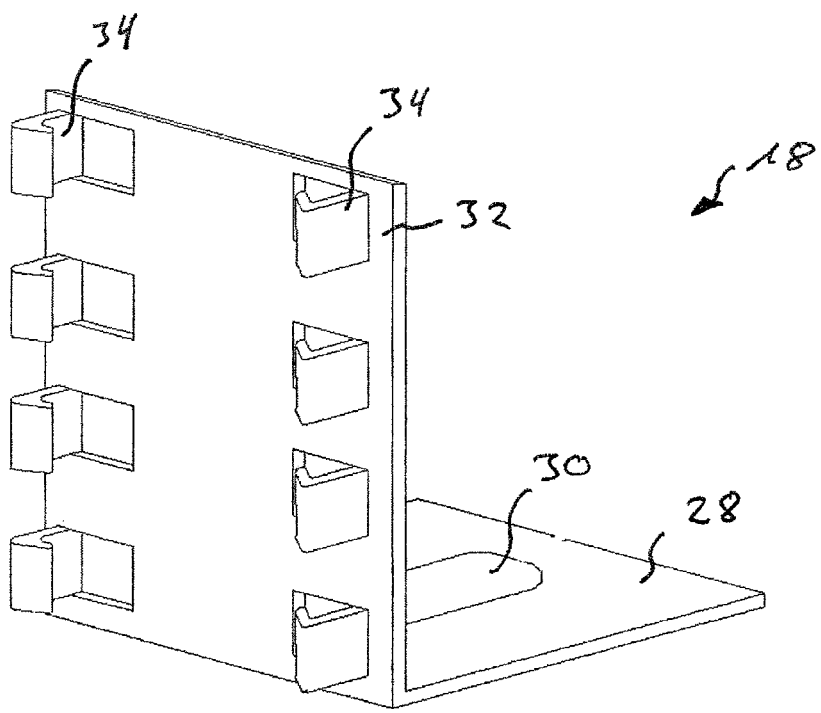
FIG. 2: a detailed view of the bracket of the firestop collar from FIG. 1.

The latching hooks 26, 34 form a latching connection with which the bracket 18 can be secured to the housing 14. For this purpose, before or after the housing 14 is installed onto a line in an installation direction R, which here runs perpendicular to the appertaining segment 20 from the outside towards the center of the housing 14, the bracket is placed onto a segment 20 and latched with the latching hooks 34 to the corresponding latching hooks 26 of the housing. Subsequently, the brackets 18 can be fastened to the substrate. In other words, the fastening of the brackets 18 to the housing 14 does not require any additional tools or additional parts. Since latching hooks 26 are provided on each of the segments 20 in the embodiment shown here, the bracket 18 can also be installed very flexibly, thus allowing a flexible fastening of the firestop collar 10. It is likewise conceivable to employ several brackets 18 in order to ensure a secure installation of the firestop collar 10. As can be seen in FIG. 2, the bracket 18 can also have several latching hooks 34 arranged pairwise opposite from each other. The abutments provided on the housing 14 are configured accordingly.

As in the present case, the housing 14 can be configured so as to be continuous. However, a gap 36 is advantageously provided on the housing 14 on a segment 20 or on a hinge 22, whereby the housing 14 can be bent open or closed at said gap 36 (see FIG. 3). As a result, the housing 14 can be placed around a line and subsequently closed at this gap 36.

In this embodiment, a segment 20a is split in two, whereby the two parts each form an end section 38 of the housing. The ends 40 of these end sections 38 are each bent, so that a stop 42 is formed by means of which the position of the end sections 38 relative to each other is defined, as will be elaborated upon below.

Figure 3:
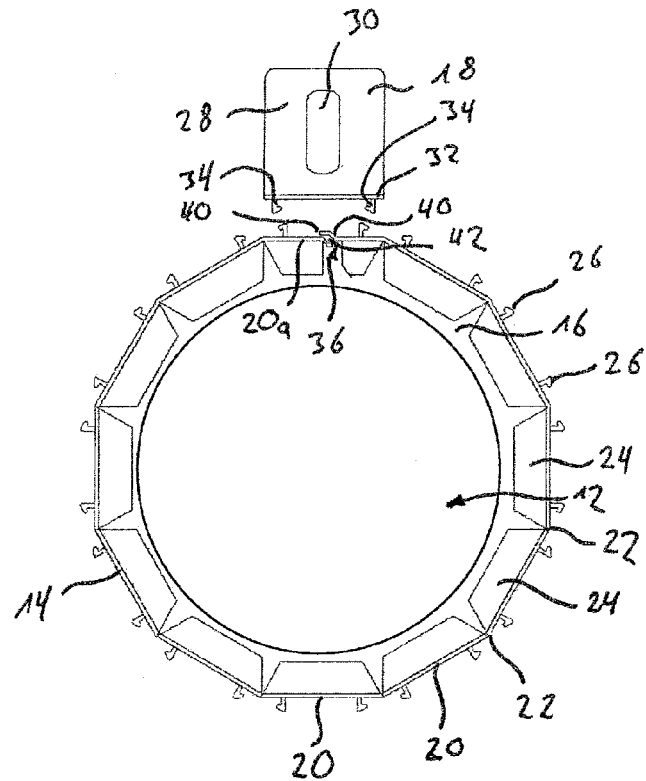
FIG. 3: a detailed depiction of the firestop collar from FIG. 1.

In the assembled state shown in FIG. 3, the distance between the latching hooks 26 is also selected on the segment 20a in such a way that the latching hooks 26 correspond to the latching hooks 34 of the bracket 18. In the placed state, the latching hooks 34 of the bracket 18 press the latching hooks 26 and thus the end sections 38 against each other, a process in which the stops 42 prevent the end sections 38 and thus the latching hooks 26 from moving towards each other. In other words, the placement of the bracket 18 pretensions and thus securely closes the closure of the housing 14 formed by the end sections 38 and the stops 42.

Figure 4:
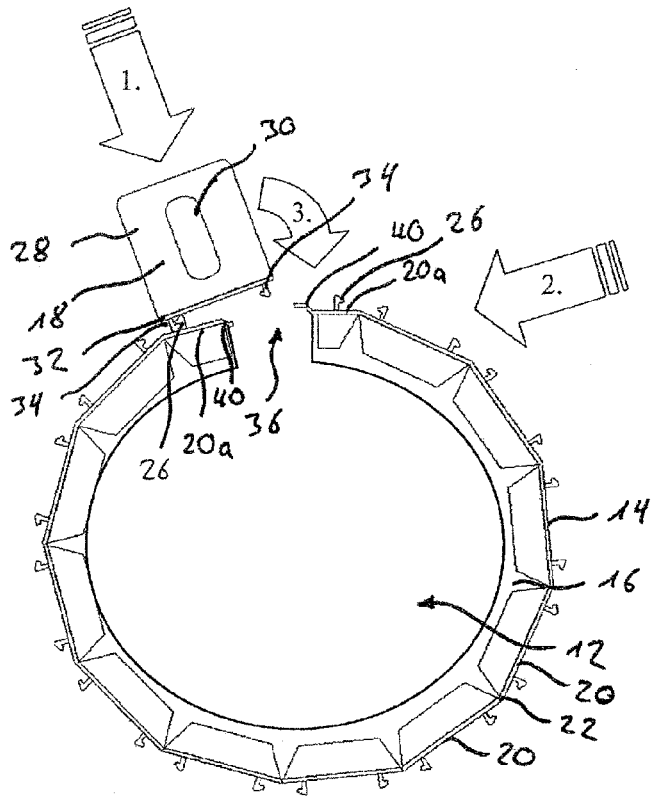
FIG. 4: the firestop collar from FIG. 3, in an intermediate state of the installation.

The installation of this firestop collar 10 is shown in FIG. 4. After the housing 14 has been placed around a line, in a first installation step, the bracket 18 is moved towards one of the end sections 38, so that a first latching hook 34 is hooked to the latching hooks 26 provided on this end section 38. Subsequently, the second end section 38 is placed against the first end section 38 and the stops 42 are positioned relative to each other. Finally, the bracket 18 is swiveled around the already hooked latching hooks, so that the latching hooks 34, 26 that have not yet been hooked also latch with each other.

Figure 5:
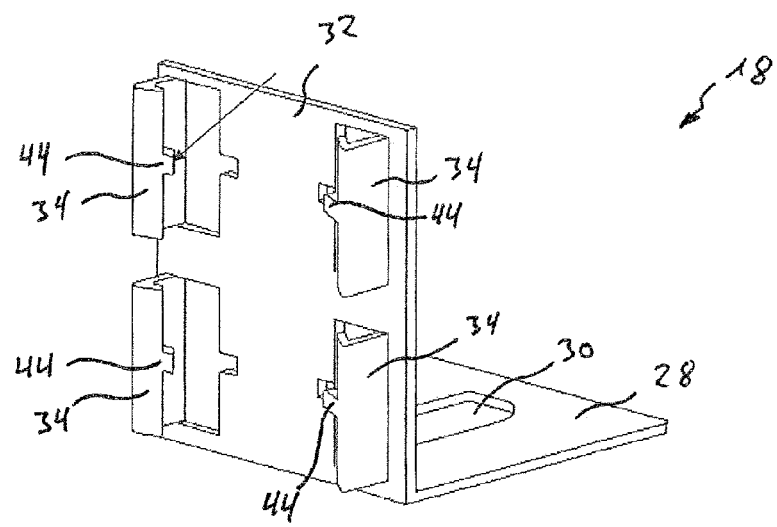
FIG. 5: another embodiment of a bracket for a firestop collar according to the invention.

Another embodiment of a bracket 18 is shown in FIG. 5. The structure of this bracket 18 corresponds essentially to the bracket 18 shown in FIG. 2. In addition, however, positioning projections 44 are provided here on the latching hooks 34. These positioning projections 44 can engage with matching recesses on the segments 20 or on the latching hooks 26, so as to prevent any movement of the bracket 18 on the housing 14 perpendicular to the installation direction. Alternatively, the positioning projections 44 allow variability in the axial direction (with respect to the surrounded line) when the latching hooks 34 of the bracket 18 mesh with the latching hooks 26 of the housing 14, so that irregular substrates to which the firestop collar 10 is secured by means of the bracket 18 can be compensated for to a certain extent. Depending on the number and distance of the latching hooks 34 of the bracket 18 that are arranged in the axial direction and depending on the width of the positioning projections 44, it is possible to compensate for irregularities of up to several millimeters.

The housing 14 of the embodiments shown here is made out of a flat sheet of metal, whereby the latching hooks 26, the tabs 24 as well as the stops 42 are each formed by means of stamping and/or bending.

Figure 6:
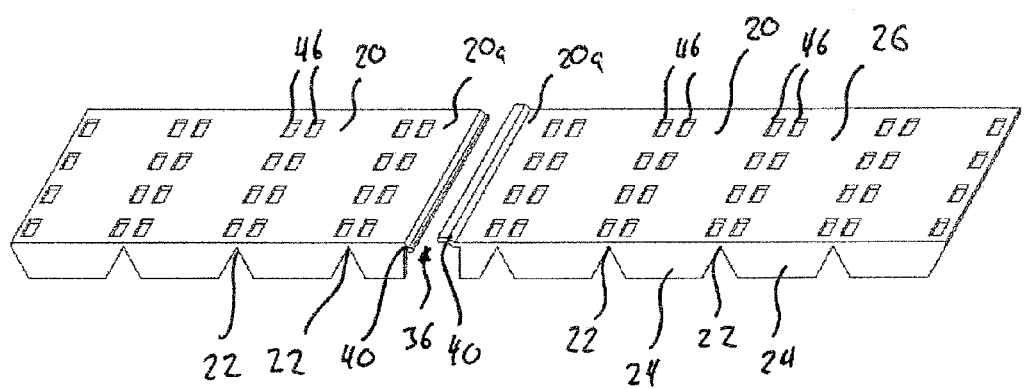
FIG. 6: a housing for a second embodiment of a firestop collar according to the invention, in an intermediate state of the production.

FIG. 6 shows such a metal sheet for another embodiment. This one differs from the embodiment shown in FIGS. 1 to 4 in that, instead of the latching hooks 26, recesses 46 are provided which form abutments for the latching hooks 34 of the brackets 18. As a result, the housing 14 does not have any projections on the outside that could pose a hindrance during the installation of the housing. In order to manufacture a housing of the type employed in the embodiment according to FIGS. 1 to 4, instead of the recesses 46, latching hook 26 are stamped out of the sheet of metal.

What is claimed is:

1. A firestop collar comprising:
a housing capable of accommodating an insert made of an intumescent firestop compound; and
at least one bracket, the bracket capable of securing the housing to a substrate, the bracket being secured to the housing by a snap-fit latching connection established by moving the bracket from an outside towards a center of the housing, the bracket being movable radially with respect to the housing as the housing contacts the bracket during establishment of the latching connection wherein the bracket includes at least two bracket latching hooks spaced apart from each other, and the housing includes at least two housing latching hooks spaced apart from each other, at least the two bracket latching hooks movable with respect to each other or the two housing latching hooks movable with respect to each other to permit the latching connection via radial movement of the bracket with respect to the housing.

2. The firestop collar as recited in claim 1 wherein the bracket latching hooks are arranged pairwise opposite from each other.

3. The firestop collar as recited in claim 1 wherein the housing latching hooks are arranged pairwise opposite from each other.

4. The firestop collar as recited in claim 3 wherein the housing has several segments bendable relative to each other, and in that the opposing housing latching hooks, except for at end sections of the housing, being arranged on one segment.

5. The firestop collar as recited in claim 1 wherein positioning projections are provided on the bracket latching hooks.

6. The firestop collar as recited in claim 1 wherein the housing has recesses for the bracket latching hooks.

7. The firestop collar as recited in claim 1 wherein the latching connection extends over a gap in the housing to close the housing in a circumferential direction.

8. The firestop collar as recited in claim 7 wherein, at ends of the housing lying across from each other at the gap, the housing has a stop positioning the two ends relative to each other.

9. The firestop collar as recited in claim 1 wherein the bracket has a slot.

10. The firestop collar as recited in claim 1 wherein the two of the bracket latching hooks are spaced apart by a distance, the two bracket latching hooks having engagement surfaces perpendicular to the radial movement during establishment of the latching connection, and having angled surfaces opposite the engagement surfaces, the angled surfaces creating a force to move the latching hooks apart during establishment of the latching connection.

11. The firestop collar as recited in claim 1 wherein the bracket latching hooks include two bracket latching hooks facing each other, and the housing latching hooks include two housing latching hooks facing away from each other.

12. A method for forming the firestop collar as recited in claim 1 comprising moving the bracket radially with respect to the housing to establish the latching connection.

* * * * *